United States Patent Office 2,730,452
Patented Jan. 10, 1956

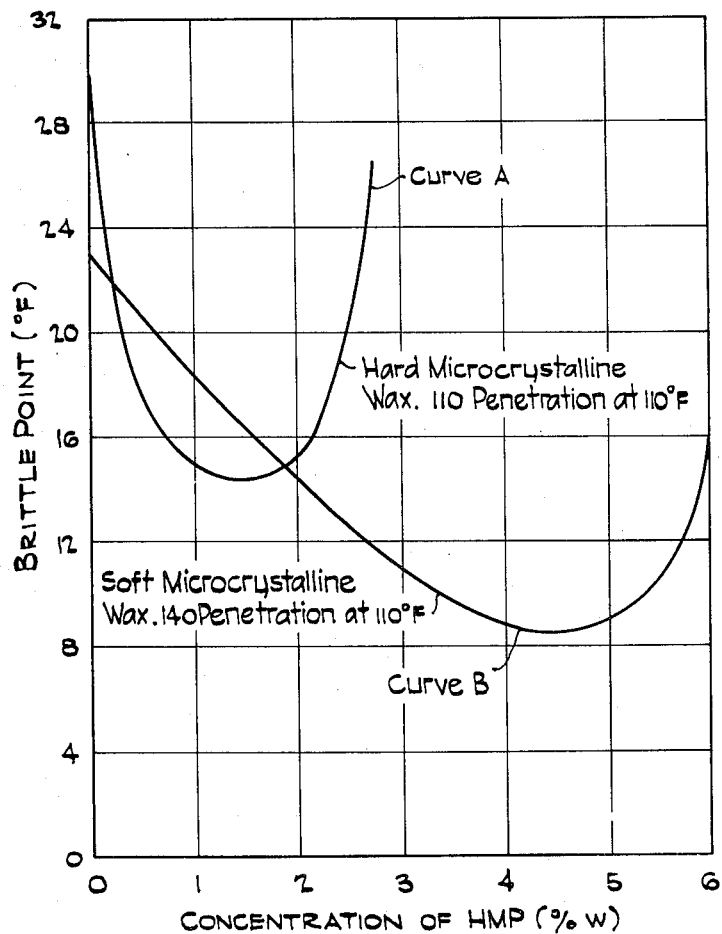
FIGURE

2,730,452

WAX COMPOSITION AND AN ARTICLE COATED THEREWITH

Robert W. B. Johnston and Stanley Marple, Jr., Houston, Tex., assignors to Shell Development Company, Emeryville, Calif., a corporation of Delaware Application February 25, 1952, Serial No. 273,246

8 Claims. (Cl. 106—270)

This invention relates to improved wax compositions, and more particularly is concerned with wax compositions possessing low brittle points and improved sealing strength.

Microcrystalline waxes are employed together with paraffin wax, or by themselves, for the impregnation and coating of sheeted materials having either a fibrous nature or pellicle form. For example, microcrystalline wax may be utilized for the lamination of cellophane and the like as well as for the preparation of vapor-proof seal coats in paper or other fibrous products. Microcrystalline waxes are employed, principally, for their property of imparting flexibility to a wax coating as well as their adhesive properties. However, it has been found that microcrystalline waxes lose these properties, at least in part, at temperatures only slightly below room temperature. Hence, sheeted materials coated or impregnated with microcrystalline wax compositions are ordinarily subject to damage if they are bent or otherwise subjected to stress while cold. The sealing strength of microcrystalline wax should remain at a high level regardless of temperature, and the so-called brittle point should be as low as possible consistent with the other properties of the wax.

It is an object of the present invention to provide improved wax compositions. It is another object of this invention to provide microcrystalline wax compositions having improved sealing strength and brittle point. It is a further object of this invention to improve the penetration and melting point of microcrystalline waxes. An object is an article of manufacture in sheet form coated with this composition.

Now, in accordance with the present invention, it has been found that microcrystalline waxes are unexpectedly improved with respect to sealing strength and brittle point by the addition thereto of a critically limited proportion of a crystalline paraffin hydrocarbon wax having a melting point of at least 165° F. More particularly it has been found that this critically limited proportion preferably should satisfy the following equation:

Weight percent paraffin wax =
$$\frac{\text{Penetration of microcrystalline wax} - Y}{10}$$

wherein $Y$ is a number which may vary between 85 and 105. While this equation includes most of the preferred compositions, the proportions generally contemplated comprise from 0.25% to 7.5% by weight, based on the wax composition, of the high melting paraffin hydrocarbon wax. The majority of optimum compositions contain from 0.5% to 5.5% by weight of the crystalline wax.

The accompanying drawing shows by curves the relation between brittle point of wax blends made in accordance with this invention and the concentration of the high melting point (H. M. P.) wax therein.

The crystalline paraffin waxes referred to hereinafter and in the claims as "high melting paraffin waxes" are high molecular weight normal and isoparaffin hydrocarbons having a minimum melting point for the entire wax of at least 165° F. Ordinarily these will melt within the range 170–195° F. while optimum results are obtained by the use of those having melting points within the range of 170–180° F. While they may be synthesized from simple hydrocarbons or obtained from certain natural sources, they are readily available in certain petroleum fractions, namely, in very high boiling (very heavy) lubricating oil distillates or, more particularly, in residual wax bearing fractions. Usually they comprise more than about 50% straight chain and less than about 50% branched chain paraffin waxes. Their refractive indices ($n90/D$) usually vary from about 1.441 (for a 175° M. P. wax) to about 1.439 (for a 193° M. P. wax).

While the preferred source of these materials is from residual petroleum fractions, the high melting paraffin waxes may be obtained from distillates as follows: suitable crude oils are topped to remove the lighter distillates, such as gasoline and kerosene, and then are subjected to further distillation to give light and medium viscosity lubricating oil fractions, as well as high viscosity lubricating oil fractions. For use in obtaining the required high melting paraffin waxes, it is preferred that the high viscosity lubricating oil fraction have a Saybolt Universal viscosity at 210° F. of at least 75 seconds and usually between about 75 and 160 seconds. High viscosity lubricating oil distillate (preferably after acid treatment and/or solvent extraction) is diluted with a solvent, such as naphtha, and chilled to a temperature lower than −10° F. and usually in the order of −25° F. to produce a precipitated wax leaving lubricating oil dissolved in the solvent. The precipitated wax may be removed by suitable means such as filtering or centrifuging. The wax so obtained is termed a "slack wax" and ordinarily has a melting point of 130–160° F. and contains approximately 40–60% oil. This slack wax is dissolved in a suitable solvent, such as petroleum spirits, and chilled to a temperature in the general range of 60–80° F., preferably about 70° F., to crystallize therefrom a paraffin wax having a melting point of at least 165° F. and generally above 170° F. Recrystallization and fractionation of this material may be carried out if a higher melting point paraffin wax fraction is desired. Crude oils from the Salt Creek Field of Wyoming contain a relatively high proportion of these high melting point paraffin waxes.

While these waxes may be obtained from petroleum lubricating oil distillates, a preferred source comprises residual oils which remain after the distillation of waxy lubricating oil fractions from a crude. One method for the separation of the desired wax from such residues comprises de-oiling the residual slack wax by dissolving the latter in solvents such as methyl ethyl ketone, benzene or toluene. In carrying out this de-oiling operation approximately 5–10 volumes of solvent to 1 volume of wax are employed at a temperature between about 110 and 160° F., preferably about 140° F., cooling the solution to a lower temperature, usually between 40° and about 75° F., to precipitate waxes while leaving the oily components and a portion of the lower melting wax constituents dissolved in the solvent. This slurry is subjected to separation procedures, such as filtration, at approximately this lowered temperature and the wax so separated is washed to recover a "primary microcrystalline wax" having a melting point of approximately 150–170° F., usually about 160° F. (ASTM Method D87–42). The "primary microcrystalline wax" is then segregated into two or more wax products by dissolving it in from about 5 to about 10, suitably about 7, volumes of a de-waxing solvent at a suitable elevated temperature to obtain a complete solution, chilling the solution to a temperature, usually between about 85 and about 125° F., to obtain a precipitate comprising the high melting paraffin waxes which are the minor component utilized in the present compositions. These high melting point waxes are highly crystalline in character and constitute sharply defined paraffin and isoparaffin waxes which are true homologs of the distillate paraffin waxes but have substantially higher molecular weights and melting points.

The exact character of this high melting point paraffin wax may be varied by adjustment of the last-named filtration or separation temperature or by recrystallization of the waxes so obtained. The higher the fitration temperature the higher the melting point of the crystalline paraffin wax obtained according to this procedure. Details of the latter process are described in a corresponding patent application, Serial No. 163,937, filed May 24, 1950, by Karekin G. Arabian, now U. S. Patent 2,668,140. These high melting paraffin waxes are distinguished by their specific gravity, refractive index, and particularly their crystalline habit, from the microcrystalline or amorphous waxes with which they are associated in the "primary microcrystalline wax." They are ordinarily present in crudes, such as Texas and other Gulf Coast crudes, in amounts varying from about 20% to about 55% by weight of the total residual waxes.

The microcrystalline waxes forming the major components present in the compositions of this invention are those which remain in solution during the splitting operation whereby "primary microcrystalline wax" is segregated into the high melting paraffin waxes and the true microcrystalline waxes. The latter are distinguished by their amorphous or extremely small crystal nature and comprise highly branched or naphthenic hydrocarbon waxes and possess a plastic nature as sharply contrasted with the highly brittle character of the high melting point paraffin waxes from which they are separated. The term "microcrystalline wax" is understood to be substantially synonymous with another common designation, namely, "amorphous wax." The preferred microcrystalline waxes have melting points within the range from about 135° F. to about 160° F., usually possess brittle points between about −5° F. to about +30° F. determined as described hereinafter, and have refractive indices from about 1.4430 to about 1.4480 (sodium D line at 90 degrees centigrade).

One method for obtaining the present compositions comprises fractionating the "primary microcrystalline wax" as described above, thus segregating true microcrystalline wax as one of the fractions, and then adding the latter to further amounts of the "primary" material in such amounts as to cause the amount of high melting paraffin wax to fall within the limits of this invention.

In accordance with the present invention, the brittle points of the last described microcrystalline waxes are lowered 10–25° F. by the incorporation therein of a critically limited proportion of the high melting paraffin waxes also described above. The equation by which the optimum degree of brittle point depression may be obtained has been given hereinbefore. It will be found, upon consideration of this equation, that the optimum proportion of high melting paraffin wax to obtain maximum brittle point depression varies in accordance with the penetration of the microcrystalline wax. As will be brought out in more detail hereinafter, soft microcrystalline waxes, i. e., those which also have relatively lower brittle points, require higher proportions of high melting paraffin wax than are needed in the relatively hard microcrystalline waxes to obtain the same degree of brittle point depression. Reference is made to the single figure of the drawing forming a part of this specification. It will be found, according to curve "A," that approximately 0.5 to about 2.5% high melting paraffin wax (175° F. melting point) was required to give maximum depression of the brittle point of a hard microcrystalline wax. Curve "B" shows that approximately 3.5–5.5% of the same high melting paraffin wax was required to obtain maximum brittle point depression of a soft microcrystalline wax. It will be found that these proportions, when calculated according to the equation given hereinbefore, satisfy the equation with respect to the proportion of high melting paraffin wax necessary to obtain optimum brittle point depression for each of the two microcrystalline waxes. The data used in the construction of the two curves given in the figure are presented in Tables I and II.

TABLE I

*Effect of high melting paraffin wax on brittle point of microcrystalline wax having a penetration of 110 at 110° F.*

| Percent high melting paraffin wax: | Brittle point, °F. |
|---|---|
| 0 | +30 |
| 1 | +15 |
| 2 | +18 |
| 3 | +25 |
| 4 | +45 |

TABLE II

*Effect of high melting paraffin wax on brittle point of microcrystalline wax having a penetration of 140 at 110° F.*

| Percent high melting paraffin wax: | Brittle point, °F. |
|---|---|
| 0 | +22 |
| 1 | +19 |
| 2 | +14 |
| 3 | +13 |
| 4 | +9 |
| 5 | +8 |
| 6 | +16 |
| 10 | +37 |

It will be found according to these tables that microcrystalline wax compositions were prepared containing varying proportions of high melting paraffin wax, the latter having a melting point of 175° F. Due to the extremely hard and highly brittle character of the high melting paraffin waxes it was entirely unexpected to discover that addition of critically limited minor amounts thereof to microcrystalline waxes actually depressed the brittle point of the latter in spite of the fact that microcrystalline waxes are already plastic in character rather than hard and brittle. Attention is called to the fact that the addition of excessive amounts in the order of 10% of the high melting paraffin wax did indeed raise the brittle point thereby exhibiting the expected hardening of the composition. However, when the proportion was restricted to the optimum percentage, i. e., between about 3½ to about 5½% for the softer microcrystalline wax, the brittle points of the compositions were lowered to a marked degree. This effect is also demonstrated in the data contained in Table I wherein the optimum percentage of high melting paraffin wax is in the order of 0.5–2.5%, while higher amounts caused hardening of the composition.

Based upon Equation I, Table III presents the proportion of high melting paraffin wax which will give maximum brittle point depression in microcrystalline waxes of varying penetrations. It will be understood that the optimum proportion of high melting paraffin wax not only must be defined with respect to the penetration of the microcrystalline wax which it modifies but also upon consideration of the particular melting point of the high melting paraffin as well. The values given in Table III are based upon high melting paraffin waxes having melting points between about 170 and 180° F. The optimum proportion of wax according to the table will be found to be in agreement with Equation I wherein the factor "Y" is about 95. This factor may be varied from 85 to 105 and preferably is restricted to between 90 and 100 while the most promising compositions are composed of proportions which will satisfy the equation when "Y" lies between 92 and 98.

TABLE III

*Optimum high melting paraffin wax content in microcrystalline wax blends*

| Microcrystalline wax penetration at 110° F.: | Optimum high melting paraffin wax, percent |
|---|---|
| 102 | 0.5 |
| 107 | 1.0 |
| 110 | 1.5 |
| 120 | 2.0 |
| 124 | 2.5 |
| 128 | 3.0 |
| 132 | 3.5 |
| 136 | 4.0 |
| 140 | 4.5 |
| 145 | 5.0 |
| 149 | 5.5 |

Wherein the claims and the specification refer to the penetration of the microcrystalline wax it will be understood that the conditions employed in such determination are according to ASTM Methods D5-25, using a 10 gram weight, the penetration being expressed in tenths of millimeters, the method being modified as follows to obtain constant results: after the melted sample is prepared according to Method D5-25, it is cooled for one hour at 77° F. followed by one hour at 110° F. before the penetration is determined.

The brittle point of the microcrystalline waxes considered here is determined according to the following procedure. The brittle point of a wax is defined as the temperature at which a given film of wax loses its flexibility and fractures when bent through an angle of 90°. In making this determination, melted wax is floated on mercury and cooled. The wax slab is then cut to provide 1" x 1½" x 0.030" plus or minus 0.003". Each strip is attached to a mechanism fixed in a temperature-controlled cabinet in such a manner that a striker arm is positioned to bend the specimen suddenly through a 90° angle. After ten minutes conditioning of the sample at the test temperature the striker arm is tripped and the sample bent. The temperature of the cabinet is decreased in small increments to the point at which a sample fractures. The temperature in degrees Fahrenheit at which fracturing occurs is defined as the brittle point of the sample.

The melting points of microcrystalline wax and of the high melting paraffin wax are obtained according to ASTM Method D87-42.

A further means of compounding the described wax blends comprises adding the "primary microcrystalline wax" referred to hereinbefore to amorphous, i. e., microcrystalline wax, in such amounts as to be within the proposed formula. As brought out above, "primary microcrystalline wax" comprises a mixture of the subject high melting paraffin waxes and true microcrystalline waxes, the proportions, as they occur naturally, being far outside the ranges meeting the subject formula.

In addition to causing the entirely unexpected depression in brittle point, the addition of high melting paraffin wax to microcrystalline waxes within the critically defined range of proportions also causes an unexpected improvement in sealing strength of the compositions. This improvement also reaches a maximum within the claimed proportion range as demonstrated by the data contained in Table IV. As the data in this table demonstrate, the addition of 5% high melting paraffin wax (175° F. melting point) to a soft microcrystalline wax caused a substantial increase of sealing strength which surprisingly enough was even more pronounced at temperatures of 50° F. than at 73° F. The effect is, however, also apparent when 1.5% high melting paraffin wax is added to a hard microcrystalline wax. In the latter instance the improvement at 50° F. is much more pronounced percentagewise than in the case of the first composition based on soft microcrystalline wax.

TABLE IV

*Effect of high melting paraffin wax on sealing strength of microcrystalline waxes*

| Wax | Sealing Strength, g./inch | |
|---|---|---|
| | 73° F. | 50° F. |
| 140 Penetration at 110° F. Microcrystalline Wax | 850 | 550 |
| Same+5% High Melting Paraffin Wax | 1,033 | 1,187 |
| 110 Penetration at 110° F. Microcrystalline Wax | 886 | 150 |
| Same+1.5% High Melting Paraffin Wax | 926 | 864 |

TABLE V

*Effect of high melting paraffin wax in paper coating blends*

Blend formula:
A—60% refined paraffin wax, 138–140° F. melting point.
B—5% polyethylene, 7000 mol. wt.
C—35% 140 penetration at 110° F. microcrystalline wax, or same modified with high melting paraffin wax.

| Component C | Sealing Strength of Blend | |
|---|---|---|
| | 73° F. | 50° F. |
| Unmodified Microcrystalline Wax | 137 | 87 |
| Unmodified Microcrystalline Wax+1% High Melting Paraffin Wax | 113 | 84 |
| Unmodified Microcrystalline Wax+5% High Melting Paraffin Wax | 162 | 105 |
| Unmodified Microcrystalline Wax+15% High Melting Paraffin Wax | 127 | 85 |

The compositions of this invention may be utilized without further modification or, as just illustrated in Table V, may be incorporated in other compositions to take advantage of the beneficial properties so obtained. For example they may be incorporated in amounts up to about 70% and preferably between about 25 and 45% by weight, based on the blend, of distillate paraffin waxes to be used for the coating or impregnation of papers. Minor amounts of other modifying substances may be present such as about 1–15%, preferably about 5%, of polymeric olefins having molecular weights of at least 1000 and preferably between about 5,000 and 25,000. Stabilizers may be present for the purpose of improving the resistance of the composition of the waxes with respect to oxidation and the like. These may be such materials as sulfur or alkylated phenols including 2,4-dimethyl-6-tertiary butyl phenol. Other additives which may be employed for the purpose of improving the tensile strength and other properties of the present wax compositions comprise soaps of higher aliphatic monocarboxylic acids preferably having at least 12 carbon atoms in the acid radical. These include especially the soaps of amphoteric metals such as aluminum, zinc, and lead as well as other polyvalent metals including tin, chromium, and titanium. They may be such species as zinc oleate, aluminum stearate, tin linoleate, aluminum 12-hydroxy stearate and the like.

The present compositions find their greatest utility in the coating or impregnation of sheeted materials for the preparation of vapor-resistant or water-resistant articles of manufacture. They may be used as laminating compositions, or in coating single or multiple sheets of paper and similar articles, or in non-fibrous pellicle sheets such as cellophane and the like. The proportion of coating or impregnating composition, based on the sheeted article, does not form a part of the present invention since they may be used in a manner well-known to the art.

One particular improvement in such articles of manufacture comprises the improved adhesion caused by the incorporation of high melting paraffin waxes in microcrystalline waxes within the defined proportions. In taking advantage of this improved property and in accordance with one phase of this invention, two sheets of paper, cellophane or the like may be impregnated or coated with paraffin wax compositions and then laminated together using as an adhesive for the formation of said laminate a microcrystalline wax composition in accordance with the present invention. It will be found that laminates so produced exhibit improved tensile strength and other properties.

We claim as our invention:

1. A wax composition consisting essentially of (a) plastic microcrystalline hydrocarbon wax having a brittle point between about −5° F. and about +30° F. and a refractive index of from about 1.443 to about 1.448, and (b) a crystalline paraffin wax having a melting point above 165° F. and a refractive index of from about 1.439 to about 1.441, the amount of said paraffin wax being from about 0.25% to 7.5% based on the weight of the microcrystalline wax, the percentage varying within said range in accordance with the following equation:

$$\frac{\text{Penetration of the microcrystalline wax at } 110° \text{ F.} - Y_1}{10} = \text{Percent paraffin wax}$$

wherein $Y_1$ is a number between 85 and 105.

2. A wax composition consisting essentially of (a) plastic microcrystalline hydrocarbon wax having a penetration at 110° F. of between about 10.0 and 15.0 mm., a brittle point between about −5° F. and about +30° F. and a refractive index of from about 1.443 to about 1.448, and (b) a crystalline paraffin wax having a melting point between about 170° F. and about 195° F. and a refractive index of from about 1.439 to about 1.441, the amount of said paraffin wax being from about 0.25% to 7.5% based on the weight of the microcrystalline wax, the percentage varying within said range in accordance with the following equation:

$$\frac{\text{Penetration of the microcrystalline wax at } 110° \text{ F.} - Y_2}{10} = \text{Percent paraffin wax}$$

wherein $Y_2$ is a number between 90 and 100.

3. A wax composition consisting essentially of (a) plastic microcrystalline hydrocarbon wax having a penetration at 110° F. of between about 11.0 and 14.0 mm., a brittle point between about −5° F. and about +30° F. and a refractive index of about 1.443 to about 1.448, and (b) a crystalline paraffin wax having a melting point between about 170° F. and 195° F. and a refractive index of from about 1.439 to about 1.441, the amount of said paraffin wax being from about 0.25% to 7.5% based on the weight of the microcrystalline wax, the percentage varying within said range in accordance with the following equation:

$$\frac{\text{Penetration of the microcrystalline wax at } 110° \text{ F.} - Y_3}{10} = \text{Percent paraffin wax}$$

wherein $Y_3$ is a number between 92 and 98.

4. A wax composition consisting essentially of (a) plastic microcrystalline hydrocarbon wax having a penetration at 110° F. of about 11.0 mm., a brittle point between about −5° F. and about +30° F., and a refractive index of from about 1.443 to about 1.448, and (b) a crystalline paraffin wax having a melting point between about 170° F. and 180° F. and a refractive index of from about 1.439 to about 1.441, the amount of said paraffin wax being from about 0.5% to about 2.5% based on the weight of the microcrystalline wax.

5. A wax composition consisting essentially of (a) plastic microcrystalline hydrocarbon wax having a penetration at 110° F. of about 14.0 mm., a brittle point between about −5° F. and about +30° F. and a refractive index of from about 1.443 to about 1.448, and (b) a crystalline paraffin petroleum wax having a melting point between about 170° F. and 180° F. and a refractive index of from about 1.439 to about 1.441, said paraffin wax being present in an amount between 3.5% and 5.5% by weight of the microcrystalline wax.

6. As an article of manufacture a sheeted material coated or impregnated with a wax composition according to claim 1.

7. A wax composition consisting essentially of a major proportion of a plastic microcrystalline hydrocarbon wax having a brittle point of between about −5° F. and about +30° F. and a refractive index of from about 1.443 to about 1.448, and from about 0.5% to 5.5% by weight of a crystalline paraffin wax having a melting point between about 170° F. and 195° F. and a refractive index of from about 1.439 to about 1.441, the percentage of the paraffin wax varying within said range in accordance with the following equation:

$$\frac{\text{Penetration of the microcrystalline wax at } 110° \text{ F.} - Y_1}{10} = \text{Percent paraffin wax}$$

wherein $Y_1$ is a number between 85 and 105.

8. A wax composition consisting essentially of a major proportion of a microcrystalline hydrocarbon wax having a brittle point of between −5° F. and +30° F. and a refractive index of from about 1.443 to about 1.448, and from about 0.25% to 7.5% of a crystalline essentially straight chain paraffin wax having a melting point between 170° F. and 195° F. and a refractive index of from about 1.439 to about 1.441, the percentage of the paraffin wax varying within said range in accordance with the following equation:

$$\frac{\text{Penetration of the microcrystalline wax at } 110° \text{ F.} - Y_1}{10} = \text{Percent paraffin wax}$$

wherein $Y_1$ is a number between 85 and 105.

References Cited in the file of this patent

UNITED STATES PATENTS

| | | |
|---|---|---|
| 2,157,625 | Page | May 9, 1939 |
| 2,361,582 | Adams et al. | Oct. 31, 1944 |
| 2,373,634 | Wagner | Apr. 10, 1945 |
| 2,443,221 | Bergstein | June 15, 1948 |
| 2,599,130 | Rumberger | June 3, 1952 |

OTHER REFERENCES

Warth's "The Chemistry and Technology of Waxes," New York, 1947, pages 247 and 249.